United States Patent Office 3,428,549
Patented Feb. 18, 1969

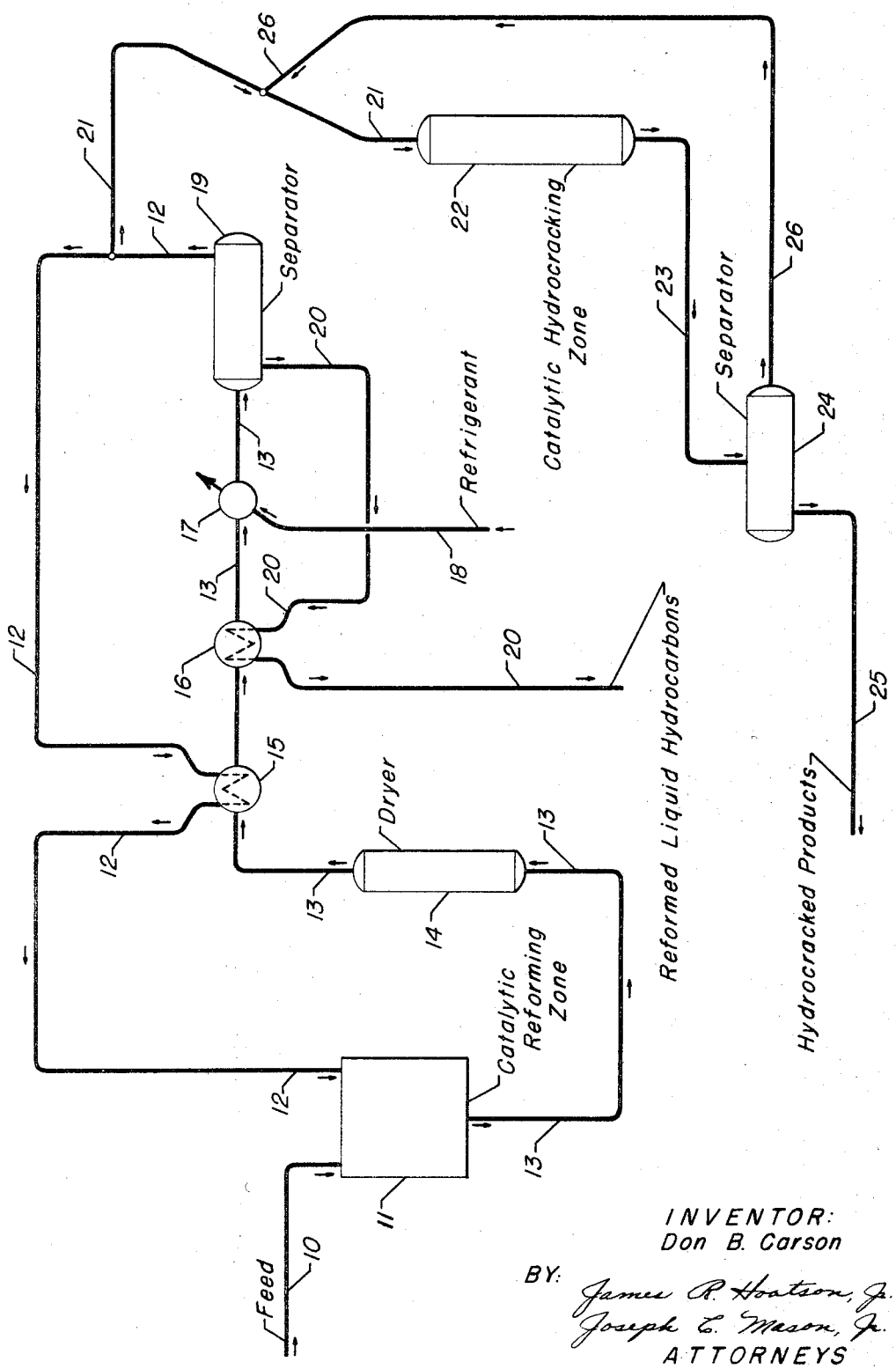

3,428,549
CONVERSION PROCESS IN THE PRESENCE OF HYDROGEN
Don B. Carson, Mount Prospect, Ill., assignor to Universal Oil Products Company, Des Plaines, Ill., a corporation of Delaware
Filed June 9, 1967, Ser. No. 644,941
U.S. Cl. 208—79      7 Claims
Int. Cl. C10g 37/10

ABSTRACT OF THE DISCLOSURE

Conversion process involving catalytic reforming and catalytic hydrocracking wherein there is provided a method for purification of the recycle hydrogen gas to the reformer and feed hydrogen gas to the hydrocracker.

BACKGROUND OF THE INVENTION

This invention relates to a combination conversion process. It particularly relates to a combination process involving catalytic reforming and catalytic hydrocracking wherein there is provided a method for purifying the off-gas from the catalytic reformer. It specifically relates to a process for upgrading hydrogen gas for recycle to the catalytic reforming reaction zone and for use in a subsequent catalytic hydrocracking reaction zone.

It is well known in the art that high quality aromatic hydrocarbons boiling in the gasoline boiling range such as benzene, toluene, and xylene, may be produced by the catalytic reforming process wherein naphtha-containing feedstocks are passed over platinum-containing catalysts in the presence of hydrogen in order to convert the feedstock into aromatic hydrocarbons. One of the predominant reactions in catalytic reforming involves dehydrogenation of naphthenic hydrocarbons. The dehydrogenation function produces a net excess of hydrogen from the process which is available for other uses such as hydrogenation reactions including desulfurization and hydrocracking. A considerable portion of the hydrogen, however, is required for recycle purposes in order that a proper partial pressure of hydrogen may be maintained in the catalytic reforming zone.

However, the catalytic reforming reaction also involves a hydrocracking function which segments hydrocarbons into relatively low molecular weight hydrocarbons such as $C_1$, $C_2$, $C_3$, etc. hydrocarbons, which then become contaminants in the gaseous hydrogen which is to be recycled to the reaction zone. In addition, these contaminants have the effect of lowering the hydrogen purity to such an extent that frequently purification techniques must be used by those skilled in the art before the net hydrogen from the reformer can be used in other chemical reactions requiring relatively high purity hydrogen. In similar manner, subsequent chemical reactions requiring hydrogen usually also require the recycle of net hydrogen gas so that a proper partial pressure of hydrogen may be maintained in the subsequent reaction zone for purposes of enhancing the reaction with hydrogen or for decreasing side reactions which produce coke, etc. Thus, subsequent chemical reactions such as hydrocracking are most efficient when the hydrogen feed gas is at a relatively high purity. For the most part, the source of hydrogen for subsequent conversion reactions is the well known catalytic reforming operation previously mentioned.

Consequently, it would be desirable to operate the catalytic reforming process so as to produce consistently relatively high purity hydrogen not only for recycle purposes, but also for other uses outside the catalytic reforming system.

SUMMARY OF THE INVENTION

Therefore, it is an object of this invention to provide a process involving catalytic reforming and subsequent catalytic conversions utilizing hydrogen gas.

It is another object of this invention to provide a process for the catalytic reforming of hydrocarbons wherein the net hydrogen produced is at relatively high purity.

Accordingly, the present invention provides a process which comprises the steps of: (a) subjecting a carbonaceous feedstock to catalytic reforming in the presence of recycle hydrogen thereby producing a reaction zone effluent containing normally liquid reformed hydrocarbons boiling in the gasoline boiling range and contaminated hydrogen; (b) chilling said effluent to sub-ambient temperature; (c) separating the chilled effluent into a hydrogen-rich stream comprising at least 90 volume percent hydrogen and a liquid stream containing said reformed hydrocarbons; (d) returning a portion of said hydrogen-rich stream to catalytic reforming zone in admixture with said feedstock; and, (e) subjecting another carbonaceous feedstock to catalytic conversion in the presence of another portion of said hydogen-rich stream.

Another embodiment of this invention includes the process hereinabove wherein said sub-ambient temperature is less than 0° F.

A still further embodiment of this invention includes the embodiments hereinabove wherein said sub-ambient temperature is from —110° F. to —300° F.

The art of catalytic reforming and the broad art of dehydrogenation of hydrocarbons is well known to those skilled in the art and need not be discussed in greater detail herein. In brief, however, suitable carbonaceous feedstocks for use in the catalytic reforming operation to produce gasoline boiling range products such as aromatic hydrocarbons are those which contain both naphthenes and paraffins in relatively high concentration. Suitable carbonaceous feedstocks include narrow boiling fractions such as naphtha fractions as well as substantially purer materials such as cyclohexane, methylcyclohexane, and the like. The preferred class of suitable carbonaceous feedstocks includes primarily straight-run gasolines such as the light and heavy naphthas. It is distinctly preferred to use a naphtha fraction boiling between, say, 100° F. and 400° F. as the feedstock to the catalytic reforming operation.

The preferred types of catalyst for use in the catalytic reforming process are well known to those skilled in the art and typically comprise platinum on an alumina support. These catalysts may contain substantial amounts of platinum, but for economic and quality reasons the platinum will usually be within the range from 0.05% to about 5.0% by weight platinum.

Satisfactory operating conditions for the catalytic reforming operation include the presence of the hereinabove mentioned catalysts and temperatures from about 500° F. to about 1050° F., preferably from 600° F. to 1000° F.; pressures from about 50 p.s.i.g. to about 1200 p.s.i.g., preferably from about 200 p.s.i.g. to 600 p.s.i.g.; a liquid hourly space velocity within the range from about 0.2 to about 20; and the presence of a hydrogen-containing gas equivalent to a hydrogen-to-hydrocarbon mole ratio of from about 0.5 to about 15.0.

Similarly, the subsequent catalytic conversion process which is preformed in the presence of hydrogen gas broadly classified as hydrogenation includes, preferably, the art of hydrocracking; although, it is not intended that this invention be necessarily limited thereto. It is known in the art that hydrocracking or destructive hydrogenation effects definite changes in the molecular structure of hydrocarbons. It produces from a relatively heavy hydrocarbon feedstock relatively light or lower molecular weight hydrocarbon products; for example, the hydrocracking reaction to convert a petroleum feedstock such as gas oil almost completely into gasoline boiling range products and lighter. Therefore, hydrocracking may be designated as a conversion process wherein not only are lower molecular weight or lower boiling conversion products produced, but these conversion products are substantially more saturated than when a hydrogen-containing gas is present.

Although many of the prior art hydrogenation processes are conducted on a strictly thermal basis, the preferred processing technique involves the stabilization of a catalytic mass possessing a high degree of hydrocracking activity. By the proper use of catalysis the hydrocracking reaction can selectively convert a wide variety of feedstocks to lower boiling distillates with significantly less coke and gas yield than are usually produced by conventional catalytic cracking processes performed in the substantial absence of hydrogen.

As used herein, the term "catalytic conversion in the presence of hydrogen" or words similar thereto is intended to cover broadly the addition of hydrogen to unsaturated bonds between carbon atoms. Therefore, the process to which this invention is directed is suitable for any purpose involving the contacting, for example, of hydrogen and liquid hydrocarbons. The particular operating conditions for these conversion functions involving reaction with hydrogen are well known to those skilled in the art. For example, the desulfurization of lubricating oils, e.g., those oils boiling between 400° F. and 800° F., is performed at temperatures ranging from 500° F. to 1000° F. and pressures up to 10,000 p.s.i.g. usually in the presence of a catalyst such as cobalt molybdate on alumina; liquid hourly space velocities (LHSV) may be varied from 0.1 to 20. Those skilled in the art know how to choose the proper operating conditions according to the characteristics of the particular system in question.

With respect to the hydrocracking reaction this reaction involves the converting of relatively heavy hydrocarbons to lower boiling hydrocarbons as previously mentioned. The relatively low boiling products can be separated into desired fractions such as a gasoline fraction containing hydrocarbons having 4 carbon atoms up to those boiling at 400° F. ($C_4$–400° F.), a middle oil containing hydrocarbons boiling from 400° F. to 650° F., a heavier hydrocarbon fraction boiling from 650° F. to 840° F., and/or recycle oil (black oils) consisting of hydrocarbons boiling above about 840° F. Other fractions can, of course, be separated as desired. Satisfactory operation conditions for the hydrocracking process include temperatures from 650° F. to 900° F. and pressures within the range from 300 p.s.i.g. to 3000 p.s.i.g. Depending upon the particular catalyst utilized contact times between the hydrocarbon and catalyst may vary from 15 minutes to about 8 hours. Hydrogen, of course, must be present and, preferably, a substantial excess is used such as a mole ratio of hydrogen-to-oil of from 2 to 20. Generally, the process conditions are adjusted to provide about 20% to 65% by volume conversion of feedstock hydrocarbons to lower boiling hydrocarbons per pass through the reaction zone. To effectuate this conversion, the chemical hydrogen consumption generally will range about 500 to about 5,000 standard cubic feet per barrel (s.c.f./b.) of feed hydrocarbons.

The catalyst employed in the hydrocracking which is the preferred subsequent operation to which the invention is applicable may be selected from the various well known hydrocracking catalysts which typically comprise a hydrogenation component and a solid acidic hydrocracking component. Preferably, the hydrocracking catalyst further comprises a minor amount of an activity-controlling material which effectively provides a balance in the catalyst hydrogenation activity relative to the acidity of the catalyst during the overall conversion reaction. The catalyst so constituted serves a dual function; that is, the catalyst is substantially non-sensitive to the presence of both nitrogenous compounds and sulfurous compounds while at the same time it is capable of effecting the destructive removal thereof, and also of converting at least a portion of those hydrocarbons boiling in the upper range of the feedstock.

The preferred hydrocracking catalyst for use in the practice of this invention will comprise minor amounts of nickel, e.g. from about 0.5% to 10% by weight nickel deposited on a silica-alumina support. Therefore, as used herein the preferred catalytic material for the hydrocracking reaction will be referred to as a nickel-containing catalyst. Other hydrocracking catalysts known to those skilled in the art may also be used in some cases with satisfactory results.

It is to be noted from the description presented thus far that the present invention provides in substance a means for substantially upgrading the quality of the hydrogen gas produced in the catalytic reforming operation for recycle purposes and/or for use in subsequent conversion operations. In brief, this hydrogen upgrading process involves heat exchanging the total effluent from a catalytic reforming operation including gaseous and liquid components in order to substantially chill the entire effluent to sub-ambient temperatures. As used herein the term "sub-ambient temperature" is used to denote a significant and substantial reduction in temperature from the reaction temperature. In other words, sub-ambient temperature also denotes a reduction in temperature of the total effluent to a level below that generally prevailing in the outside air temperature. Specifically, this term includes a temperature of less than 0° F. and, preferably, includes a temperature ranging from −100° F. to −300° F.

The method of chilling or cooling the total effluent stream may be any means known to those skilled in the art. It is contemplated herein that a combination heat exchange system between the previously dried total effluent and chilled reaction products plus refrigerant heat exchange will be utilized to achieve the desired sub-ambient temperature. Those skilled in the art are familiar with these techniques and greater detail thereof will not be presented. In brief, however, suitable refrigerants which may be used to substantially lower the temperature of the total effluent stream include normally gaseous hydrocarbons such as propane, inert gases such as nitrogen, each passing through suitable expansion devices, can be used. As previously mentioned, the total effluent, of course, must be substantially dried so that water will not freeze at the lower temperatures contemplated herein. The drying operation, of course, may be achieved through any well known means. For example, the total effluent may be passed across molecular sieves or solid alumina particles or the entire effluent may be contacted with a glycol solution in order to remove water therefrom, etc.

The unique features of this invention are best understood by a comparison with well known prior art schemes. Normally, the prior art scheme will operate the catalytic reforming operation conventionally and then subject the total effluent to separation whereby a gaseous stream comprising hydrogen is obtained and a liquid stream comprising reformed hydrocarbons is also obtained. Generally, the prior art will recycle the separated gaseous stream containing hydrogen directly to the catalytic reforming zone. In practically all cases, however, the off-gas from the catalytic reforming zone is not suitable for use in subsequent conversion processes without substantial purification. Usually, these prior art purification techniques include cyrogenic means on the hydrogen gas for condensing the hydrocarbonaceous contaminants from the hydrogen gas. These cyrogenic means add substantially to the capital investment cost of subsequent catalytic conversion processes. In addition, without purifying the recycle gas to the reforming operation, there is included in prior art schemes substantial compressor costs since the reforming operation depends to a considerable extent on the amount of pure hydrogen present in the reaction zone. Therefore, enormous quantities of relatively impure hydrogen must be recycled in order to achieve the proper pure hydrogen level in the catalytic reforming step. It should also be noticed at this point that it is a critical feature of the present invention that the entire effluent from the catalytic reforming zone including liquid and gaseous products be subjected to the same chilling or cooling steps as more fully discussed hereinbelow.

The invention may be more fully understood with reference to the appended drawing which is a schematic representation of apparatus for practicing one embodiment of the invention.

DESCRIPTION OF THE DRAWING

Referring now to the drawing, a petroleum-derived naphtha fraction is introduced via line 10 into catalytic reforming zone 11 which contains a platinum catalyst and is operated under conventional reforming conditions. For purposes of emphasis, recycle hydrogen of relatively high purity is also introduced into catalytic reforming zone 11 from line 12.

The total or entire effluent from the catalytic reforming zone 11 is withdrawn via line 13 and passed through drying zone 14 containing molecular sieves. The operating conditions in drier 14 are conventional and are sufficient to remove substantially all of the water present in the total effluent stream. In any event, the amount of residual water remaining in the total effluent stream is not of such quantity that freezing problems will be experienced in the subsequent low temperature steps of this invention.

The dried total effluent in line 13 is next passed through heat exchanger 15 wherein heat is given up to the returning cooled hydrogen gas stream in line 12. A significant drop in temperature is experienced in the total effluent stream at this point. The effluent stream continues through exchanger 16 which is heat exchanged with the cooled liquid product stream in line 20 more fully discussed hereinafter. Finally, the total effluent stream is passed through exchanger 17 in indirect contact with a conventional refrigerant, such as expanded propane, introduced through exchanger 17 via line 18. The cooled or chilled effluent is now at its desired sub-ambient temperature of, say −250° F., and is then introduced into separator 19 at substantially that temperature. Suitable conditions are maintained in separator 19 to produce a relatively high purity hydrogen-rich stream in line 12 of at least 90% (volume), typically, about 92–95%, hydrogen gas. There is, also, separated in separator 19 a cooled liquid product stream in line 20 containing normally liquid reformed hydrocarbons boiling in the gasoline boiling range. This cooled liquid stream at substantially the desired sub-ambient temperature is passed in indirect heat exchange with the total effluent stream through exchanger 16 as previously discussed.

A portion of the hydrogen-rich stream is returned to catalytic reforming zone via line 12 wherein, as previously mentioned, it picks up heat from the total effluent stream by passage through exchanger 15.

Another portion of the hydrogen-rich stream, typically the remainder of the hydrogen-rich stream, is passed via line 21 through heat exchange means (not shown) into a subsequent catalytic conversion zone such as hydrocracking zone 22 which contains a nickel catalyst and is operated under conventionally hydrocracking conditions. The carbonaceous feed stock to this catalytic conversion zone is introduced conventionally by means not shown; typically, it is a gas oil boiling range material. The effluent from catalytic hydrocracking zone 22 is withdrawn via line 23 and passed into separator means 24. Sufficient conditions are maintained in separator 24 to produce a hydrogen-rich stream which is recycled to reaction zone 22 via line 26. A hydrocracking product stream is withdrawn from the system via line 25.

By operating in the manner taught by this invention and the use of purified hydrogen in a typical hydrocracking unit the following significant advantages are obtained over the process schemes of the prior art: due to the removal of methane and heavier hydrocarbons from the reformer recycle gas the amount of combined feed to the reforming reactor section is substantially reduced, which in turn results in reduced utilities or results in additional feedstock capacity in the case of an existing catalytic reformer; the reformer compressor horsepower requirements for the recycle hydrogen gas are remarkably reduced due to the reduced moles of recycle gas and due to the reduced volume of the recycle gas accomplished by the significant reduction in temperature; the booster compressor horsepower requirements for the net hydrogen produced from the system is similarly reduced; and finally, the recovery of the frequently desired $C_3$ and $C_4$ hydrocarbons from the normally liquid reformed hydrocarbons is enhanced.

Similar benefits may be achieved in the subsequent catalytic conversion operation. Certainly, the combined feed to the subsequent conversion reaction section is reduced due to the removal of methane and heavier hydrocarbons from the hydrogen feed gas. Also, less moles of recycle gas must be circulated in the subsequent conversion operation due among other things to the increased hydrogen content of the gas stream to the subsequent conversion catalytic section. Other benefits will be recognized and achieved by those skilled in the art from the practice of this invention as broadly taught herein.

In brief, the practice of the present invention achieves its greatest economy and benefit for those catalytic reforming operations which produce a relatively impure hydrogen off-gas stream; for example, those operations that produce hydrogen off-gas with a purity of less than 80% by volume and, typically, in the range from 50% to 70% by volume. These impure hydrogen operations normally are the result of processing feedstocks to the catalytic reforming zone which are relatively low in napthenic hydrocarbon content such as about 10% to 15% by volume naphthenes. On the other hand, it must be recognized that benefit is achieved in the practice of this invention even in those catalytic reforming operations which are as high as about 90% by volume hydrogen. These relatively high purity hydrogen operations are normally the result of process feedstocks to the catalytic reforming zone which contain from 60% to 70% by volume naphthenic hydrocarbons. In virtually every case the practice of the present invention will produce higher purity recycle hydrogen gas; that is, the resulting gas for recycle purposes and/or other uses will be at least 90% (by volume) hydrogen gas, typically, 92–95%, and frequently will be above 98% by volume hydrogen gas.

PREFERRED EMBODIMENT

Therefore, from the detailed description presented hereinabove, a preferred embodiment of this invention provides an improvement in a process for catalytic reforming of hydrocarbons in the presence of hydrogen to produce high quality gasoline boiling range products wherein a portion of the hydrogen off-gas is used in a subsequent catalytic conversion process which comprises the steps of: (a) introducing the entire effluent from the catalytic reforming zone, including gaseous and liquid components, into a chilling zone maintained under conditions sufficient to cool said effluent to a temperature from −100° F. to −300° F.; (b) separating the cooled effluent at substantially said temperature into a hydrogen-rich stream comprising at least 90 volume percent hydrogen, and a liquid stream containing said gasoline products; (c) returning a portion of the separated hydrogen-rich gas to the catalytic reforming reaction zone; and, (d) introducing another portion of the separated hydrogen-rich gas into said subsequent catalytic conversion process reaction zone.

Another specifically preferred embodiment of this invention includes the improvement hereinabove wherein said subsequent conversion process comprises hydrocracking.

The invention claimed:
1. Process which comprises the steps of:
   (a) subjecting a carbonaceous feedstock of catalytic reforming in the presence of recycle hydrogen thereby producing a total reaction zone effluent containing normally liquid reformed hydrocarbons boiling in the gasoline boiling range and contaminated hydrogen;
   (b) chilling said effluent to sub-ambient temperature;
   (c) separating the chilled effluent into a gaseous hydrogen-rich stream comprising at least 90 volume percent hydrogen, and a liquid stream containing said reformed hydrocarbons;
   (d) returning a portion of said hydrogen-rich stream to catalytic reforming zone in admixture with said feedstock; and,
   (e) subjecting another carbonaceous feedstock to catalytic conversion in the presence of another portion of said hydrogen-rich stream.

2. Process according to claim 1 wherein said sub-ambient temperature is less than 0° F.

3. Process according to claim 2 wherein said sub-ambient temperature is from −100° F. to −300° F.

4. Process according to claim 3 wherein said catalytic conversion of Step (e) comprises hydrocracking.

5. In a process for catalytic reforming of hydrocarbons in the presence of hydrogen to produce high quality gasoline range products wherein a portion of the hydrogen off-gas is used in a subsequent catalytic conversion process, the improvement which comprises the steps of:
   (a) introducing the entire effluent from the catalytic reforming zone, including gaseous and liquid components, into a chilling zone maintained under conditions sufficient to cool said effluent to a temperature from −100° F. to −300° F.;
   (b) separating the cooled effluent at substantially said temperature into a gaseous hydrogen-rich stream comprising at least 90 volume percent hydrogen, and a liquid stream containing said gasoline products;
   (c) returning a portion of the separated hydrogen-rich gas to the catalytic reforming reaction zone; and,
   (d) introducing another portion of the separated hydrogen-rich gas into said subsequent catalytic conversion process reaction zone.

6. Improvement according to claim 5 wherein said subsequent conversion process comprises hydrocracking.

7. Improvement according to claim 5 wherein said total effluent of Step (a) is cooled in said chilling zone by
   (i) passing said total effluent into indirect heat exchange with at least a portion of said recycle hydrogen gas thereby partially cooling said effluent;
   (ii) introducing said partially cooled effluent into indirect heat exchange with said liquid stream of Step (b); and,
   (iii) passing the total effluent stream from Step (ii) into a refrigeration zone thereby cooling said total effluent to said temperature of Step (a).

References Cited
UNITED STATES PATENTS

| | | | |
|---|---|---|---|
| 3,008,895 | 11/1961 | Hansford et al. | 208—68 |
| 3,283,021 | 11/1966 | Hardison | 260—683.65 |

DELBERT E. GANTZ, Primary Examiner.

G. E. SCHMITKONS, Assistant Examiner.

U.S. Cl. X.R.

208—111, 139; 260—672